May 11, 1954
W. W. SINGER
2,678,076
SECTIONAL WHEEL AND TIRE
Filed Sept. 17, 1952
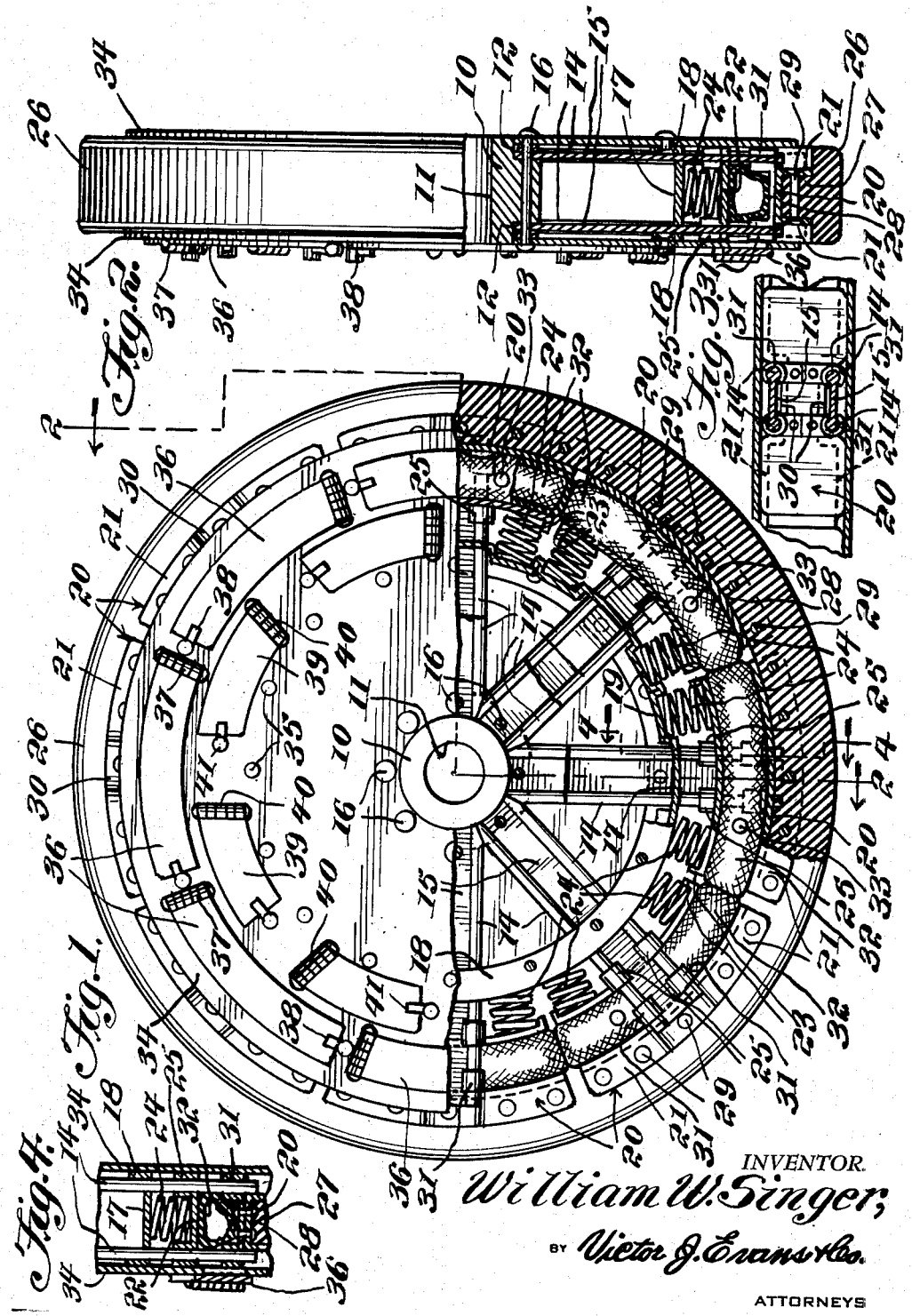
INVENTOR.
William W. Singer,
BY Victor J. Evans & Co.
ATTORNEYS Patented May 11, 1954

2,678,076

UNITED STATES PATENT OFFICE 2,678,076

SECTIONAL WHEEL AND TIRE

William W. Singer, New Orleans, La.

Application September 17, 1952, Serial No. 309,961

1 Claim. (Cl. 152—35)

This invention relates to a vehicle wheel and tire, and more particularly to a sectional wheel and tire.

The object of the invention is to provide a sectional wheel and tire which is puncture proof and which will not be affected by a blow-out.

Another object of the invention is to provide a sectional wheel and tire which is constructed so that it includes shock absorbers whereby the occupants of the vehicle will be able to travel in greater comfort and safety, the wheel of the present invention being quiet in use and ruggedly constructed and whereby certain of the parts can be readily replaced in the event such parts become worn out or broken so that the necessity of jacking up the vehicle to change the tire is eliminated.

A further object of the invention is to provide a sectional wheel and tire which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view, with parts broken away and in section.

Figure 2 is a sectional view taken on the line 2—2 of Figure 1.

Figure 3 is a fragmentary sectional view showing certain constructional details of the spokes and rim.

Figure 4 is a sectional view taken on the line 4—4 of Figure 1.

Referring in detail to the drawings, the numeral 10 designates the hub which may be fabricated of any suitable material, and the hub 10 is provided with a central opening 11 therein for the projection therethrough of a vehicle axle. The hub 10 is further provided with an annular cut-out 12 on each side thereof. Spokes 14 have their inner ends seated in the cut-outs 12 and the spokes 14 are secured to the hub 10. Guide members 15 interconnect the spokes 14 together, the spokes 14 being arranged in pairs, Figure 3.

The inner ends of the guide members 15 are secured to the hub 10 by suitable securing elements such as rivets 16. Arranged in concentric relation about the hub 10 is a rim which is indicated generally by the numeral 17. The rim 17 is provided with a pair of side flanges 18 for a purpose to be later described, and the rim 17 is further provided with a plurality of sockets or recesses 19.

Arranged in concentric relation about the rim 17 is a plurality of arcuate rim sections 20. Each of the rim sections 20 is provided with a pair of side flanges 21. Interposed between the rim 17 and the rim sections 20 is a plurality of arcuate or curved body members 22, and arranged on each end of each of the body members 22 is a lip 23. Coil springs 24 are seated in the recesses 19 in the rim 17, and the coil springs 24 abut or engage the inner surface of the body members 22. A pair of bosses 25 are secured to the inner surface of each of the body members 22, and the bosses 25 slidably engage the spokes 14.

The sectional wheel and tire of the present invention further includes an annular tire body 26 which may be made of hard rubber. The tire body 26 includes an inwardly extending annular rib portion 27 which snugly seats within an annular groove or channel 28 that is formed in the rim sections 20. Suitable securing elements such as rivets 29 serve to connect the tire body 26 to the rim sections 20, the rivets 29 extending through the flanges 21 of the rim sections.

The rim sections 20 are provided with cut-outs 30 so as to provide sufficient clearance for the spokes 14, and bosses 31 are arranged on the rim sections 20 for slidably engaging the spokes 14.

Interposed between the body members 22 and the rim sections 20 is a plurality of innertubes 32 which are adapted to be inflated with air by means of valves 33. The sectional wheel and tire of the present invention further includes a pair of plates or covers 34 which are arranged in spaced parallel relation with respect to each other on each side of the wheel. The securing elements 16 may be used for securing the plates 34 to the hub 10, and other securing elements such as rivets 35 serve to secure the plates 34 to the flanges 18 of the rim 17. One of the plates 34 is provided with a plurality of doors or gates 36 which are hingedly connected to the plates 34 by hinges 37. Suitable latches 38 are provided for maintaining the doors 36 in their locked position. By opening the doors 36 access can be gained to the innertubes 32. Other doors 39 are hingedly connected to the plate 34 by hinges 40, and latches 41 serve to maintain the doors 39 in their closed position. By opening the doors 39, access can be gained to the springs 24.

From the foregoing, it is apparent that a sectional wheel and tire has been provided which is shock-proof and puncture proof. The springs 24 and the air inflated innertubes 32 provide a cushioning effect and act as shock absorbers. In the event that any of these parts become damaged or worn out, the doors 39 and 36 can be opened in order to gain access to these members. The tire and wheel are made in sections and the outer tire body 26 may be made of hard rubber or other material. The tire will not be susceptible to blowouts and the inner ends of the spokes 14 may be riveted to the hub 10. The spokes may be made of steel with a guide therebetween. The innertubes 32 serve to deaden the sound of the hard tire on paved streets and also the innertubes help to absorb any shocks from the body of the car and the rear end. The springs 24 also act as shock absorbers and absorb part of the strains and stresses from the vehicle body and insure that the occupants will be able to travel more smoothly and comfortably and safely. A suitable cap can be provided for covering the axle hub. By means of the present invention in the event that an innertube or spring needs replacement, such changes can be made in a short period of time since the gates or doors in the wheels can be opened whereby the tires having the innertubes therein, or the springs can be changed without the necessity of jacking up the vehicle. Also, it will not be necessary to carry spare wheels or tires or change them and it will only be necessary to carry spare springs or innertube sections. The usual brakes and other connections for the wheel of the present invention will be the same as in the ordinary vehicle.

I claim:

A sectional wheel and tire comprising a hub provided with a central opening therein, a plurality of spokes extending radially from said hub, a curved rim provided with flanges connected to said spokes, a plurality of curved rim sections arranged concentrically about said rim and having flanges thereon, a plurality of curved body members interposed between said rim and rim sections and having bosses slidably engaging said spokes, a plurality of coil springs positioned between said rim and body members, a plurality of innertubes interposed between said body members and said rim sections, a tire body of hard rubber arranged around said rim sections and connected thereto, a pair of spaced parallel cover plates connected to said hub and flanges, and doors hingedly connected to said cover plates.

References Cited in the file of this patent

UNITED STATES PATENTS

| Number | Name | Date |
|---|---|---|
| 1,133,130 | Granger | May 23, 1915 |
| 1,630,865 | Schultz | May 31, 1927 |